(No Model.)

G. P. A. GUNTHER.
FISH TANK OR AQUARIUM.

No. 546,883. Patented Sept. 24, 1895.

Witnesses
Murray C. Boyer
R. Schleicher

Inventor
Geo. P. A. Gunther
by his Attorneys
Howson & Howson

UNITED STATES PATENT OFFICE.

GEORGE P. A. GUNTHER, OF SCHWENKSVILLE, PENNSYLVANIA.

FISH-TANK OR AQUARIUM.

SPECIFICATION forming part of Letters Patent No. 546,883, dated September 24, 1895.

Application filed February 11, 1895. Serial No. 537,881. (No model.)

*To all whom it may concern:*

Be it known that I, GEORGE P. A. GUNTHER, a citizen of the United States, and a resident of Schwenksville, Montgomery county, Pennsylvania, have invented certain Improvements in Fish-Tanks or Aquariums, of which the following is a specification.

My invention relates especially to that class of aquariums designed for household use or for keeping fish, such as trout or bass, whose natural habitat is a running stream or brook, the object of my invention being to maintain the water pure, fresh, and clear without the necessity of having any permanent waste connection or supplying fresh water except to take the place of that withdrawn occasionally with the removed impurities, the same body of water being continually used, but being subjected to continual purification and aeration, so as to maintain it in proper condition for supporting the healthy life of the fish contained therein.

Figure 1:
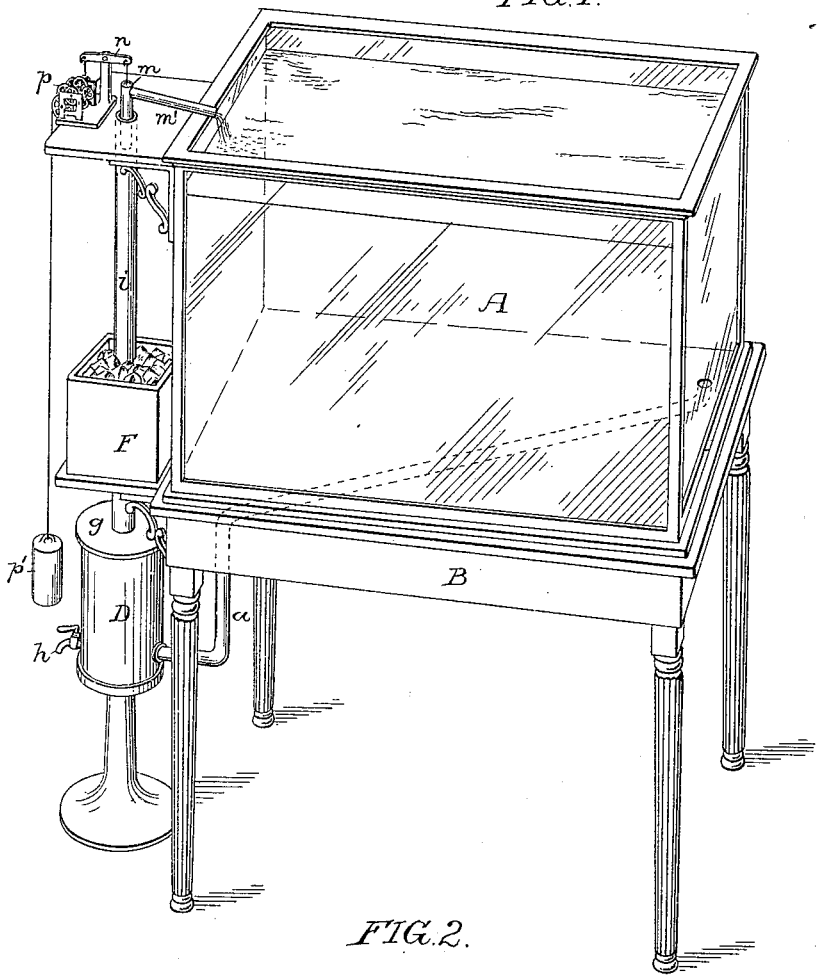
Figure 2:
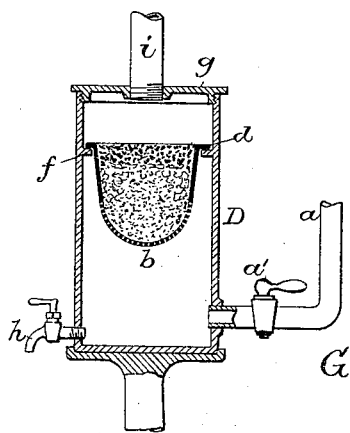

In the accompanying drawings, Figure 1 is a perspective view of an aquarium and attachments therefor constructed in accordance with my invention, and Fig. 2 is an enlarged sectional view of a combined filter and sediment-collector constituting one of said attachments.

A represents an aquarium, which may be of any suitable construction and of any desired size and shape, the aquarium being preferably mounted on the table B or being itself provided with supporting legs or feet, so as to maintain the body of water contained in it at a considerable level above the floor.

The aquarium discharges at a point near one corner of the bottom of the same through a pipe $a$, which communicates with the bottom of a vessel D, suitably mounted below and at one side of the aquarium, this vessel having in its upper portion a filter of any desired character, that shown in the drawings being a cup $b$, packed with appropriate filtering material and having a perforated bottom, said cup having a top flange $d$, resting upon an internally-projecting rib $f$ in the vessel D, so that it can be readily removed for cleansing or refilling when desired, the top of the vessel being closed by a detachable screw-cap $g$.

With the lower portion of the vessel D communicates a cock or faucet $h$, through which the contents of said vessel and, if desired, also the water in the aquarium A can be drawn off, although it is preferable to provide the pipe $a$ with a valve $a'$ in order to cut off communication between the aquarium A and the vessel D when desired.

From the cap $g$ of the vessel D a pipe $i$ extends upward through a box F, suitably supported at one side of the aquarium and adapted for the reception of ice in order to cool the water ascending in the pipe $i$, the latter terminating above the level of water in the aquarium A, so that the water stands at the same level both in the pipe and in the aquarium.

Projecting into the upper end of the pipe $i$ and extending downwardly into the same to a point below the level of the water therein is a pump-barrel $m$, having a discharge-spout $m'$, extending over the aquarium A, preferably at the corner diagonally opposite that into which the outlet communicates, the plunger of the pump $m$ being connected to one arm of a lever $n$, the other arm of which is connected to a crank-pin on a wheel, which is rotated in any suitable manner. In the present instance the wheel forms one of a train of gears $p$, to which motion is imparted by means of a suspended weight $p'$; but it will be evident that a spring or electrically driven motor may be employed for operating the pump without departing from my invention.

When the pump is in operation, there is a constant flow of water from the aquarium through the pipe $a$, vessel D, and pipe $i$, and thence through the pump back into the aquarium again, the rate of flow being dependent upon the speed at which the pump is driven and upon the capacity of the pump. I prefer to use a pump of small capacity, so that there is a slow but steady withdrawal of the water from the aquarium, the flow not being sufficiently rapid to cause any material disturbance of the body of water in the vessel D, so that the fish-slime and other solid impurities held in suspension in the water will settle to the bottom of said vessel before reaching the filter $b$, the latter serving to separate the remaining impurities from the water. Hence the latter is pure and clear when it enters the pipe $i$ and is returned from the same to the aquarium by means of the pump m, the flow of the water through the pump and the fall of the same from the discharge-spout into the aquarium serving to aerate it, whereby the water in the aquarium is maintained at all times in proper condition for insuring the healthful life of the fish contained therein. The provision of the ice-box F also enables me to so cool the water during the summer season that the health of the fish will not be injured by reason of the overheating of the water in the aquarium, this, as well as the stagnant character of the water, being one of the main reasons why it is difficult to keep fish in a healthy condition in ordinary household aquariums. At intervals the faucet h can be opened, so as to withdraw from the vessel D the sediment collected therein, fresh water in this case being added to the aquarium to take the place of that withdrawn with the sediment.

Having thus described my invention, I claim and desire to secure by Letters Patent—

The combination of an aquarium, a drain pipe leading from the bottom of the same and communicating with a settling chamber, a filter above said settling chamber, a pipe communicating with a chamber above the filter, and a pump whereby water is drawn through said pipe and returned to the aquarium, substantially as specified.

In testimony whereof I have signed my name to this specification in the presence of two subscribing witnesses.

GEORGE P. A. GUNTHER.

Witnesses:
FRANK E. BECHTOLD,
JOSEPH H. KLEIN.